Aug. 27, 1968

B. W. BRUNSON 3,398,788

HEAT EXCHANGE TUNNEL

Filed June 6, 1966

INVENTOR.
BRUCE W. BRUNSON
BY Price & Henveld
ATTORNEYS

INVENTOR.
BRUCE W. BRUNSON
BY
ATTORNEYS

3,398,788
HEAT EXCHANGE TUNNEL
Bruce W. Brunson, Grand Rapids, Mich., assignor to Werner Machinery Co., Grand Rapids, Mich., a corporation of Michigan
Filed June 6, 1966, Ser. No. 555,392
5 Claims. (Cl. 165—120)

ABSTRACT OF THE DISCLOSURE

In a heat exchange tunnel for cooling or heating articles, an air pervious belt is provided for carrying the articles. Above the belt is a pressure duct and below a suction chamber. A heat exchange and pressure unit supplies heated or cooled air to the pressure duct which has a plurality of spaced, jet nozzles with jet orifices extending across the belt. The jet orifices provide a plurality of curtain-like jets which impinge on the articles to cool the same.

---

This application relates to heat exchange tunnels and, more particularly, to such tunnels particularly adapted for use in heating, cooling or freezing baked or unbaked dough products during preparation of them for distribution.

Modern commercial baking techniques generally require a continuous type of baking operation from the time that the dough is mixed until the goods are packaged for distribution. Because the goods are hot as they emerge from the oven some type of artificial cooling environment is often provided in order to assure faster continuous operation of the assembly line. Otherwise, the goods must either be removed from the conveyor-type assembly or the assembly must be lengthened to such an extent as to render it extremely space consuming. It has become customary in the art to provide a cooling tunnel along the assembly line such that goods emerging from the ovens enter the cooling tunnel and are ready to be processed and packaged as they emerge therefrom.

Similarly, it is often desirable to freeze or heat goods of this type in assembly line fashion. Again, in order to accomplish these purposes, it has become customary in the prior art to provide a tunnel through which the goods are passed during travel on the various conveyor systems. The goods enter the tunnel at one end and emerge from the other in the desired heated or frozen condition.

Prior art tunnels for these purposes generally comprise elongated enclosures through which a conveyor band traverses. Positioned above the conveyor band is a pressure duct through which artificially processed air or other cooling or heating mediums is pumped into the tunnel and onto the goods passing therethrough such that heat exchange between the goods and the air may occur. Suitable means are provided, usually in the bottom section of the tunnel, to return the air for reprocessing and redistribution.

In order to assure relatively efficient utilization of the artificially processed air, it is necessary to provide some sort of nozzle means between the pressure duct and the interior of the tunnel such that regular and reasonably uniform air flow may be maintained throughout the tunnel. The prior art devices have solved this problem through the utilization of a plurality of circular apertures in the bottom of the pressure duct through which the cooled air escapes into the cooling tunnel. These circular apertures are spaced completely along or at discrete sections of the tunnel and the air flowing therefrom strikes the goods to be processed prior to entering the return ductwork for recirculation.

The prior art nozzle system has not proved satisfactory for a number of reasons. First, it is extremely difficult to position the circular apertures in the lower surface of the pressure duct in such a manner that the heating or cooling medium flows uniformly throughout the tunnel and thus uniformly heats or cools the goods regardless of their lateral position on the conveyor belt. Second, it is difficult to direct the heat exchange medium against the goods to be processed with sufficient velocity to break up the boundary layer around the goods which, of course, acts as an insulating barrier. Only by breaking up this barrier so as to bring the outside of the goods to the temperature of the heat exchange medium can a maximum temperature gradient from the center to the outside of the product be obtained. This maximum temperature gradient, of course, results in most efficient cooling or heating of the product. Third, the relative inefficient utilization of heat exchange medium naturally requires larger ductwork and medium processing equipment in order to assure that the goods will be thoroughly heated, cooled or frozen when they emerge from the tunnel. This, of course, results in increased purchase and utilization costs. Fourth, the increase in the size of ductwork and heat exchange medium processing equipment directly result in a rather inefficient utilization of floor space within the baking concern.

It is an object of this invention to provide a heat exchange tunnel which is not subject to the above outlined disadvantages.

More particularly, it is an object of this invention to provide a heat exchange tunnel wherein the heated or cooled exchange medium flows from the pressure duct in a high velocity curtain-like configuration at predetermined intervals along the tunnel.

It is an object of this invention to provide a heat exchange tunnel utilizing a novel type of nozzle with substantially reduced orifice turbulence, enabling a higher velocity impingement of the heat exchange medium upon the goods to be processed.

It is an object of this invention to provide a heat exchange tunnel which attains a relatively maximum amount of heat exchange within a relatively small enclosure and which utilizes relatively compact equipment, thus resulting in a savings in initial cost and operation.

These and other objects of this invention will be clearly understood by reference to the following specification and accompanying drawings in which:

FIG. 3 is a broken side-elevational view of a section of pressure duct with the elongated-orifice nozzles extending therefrom;

FIG. 4 is a broken plan view of a section of pressure duct; and

Briefly, this invention comprises a heat exchange tunnel having a mesh-type conveyor band traversing therethrough upon which the goods to be heated, cooled or frozen are placed. Positioned above the conveyor band is a pressure duct having a series of elongated orifice nozzles communicating therewith and directed towards the conveyor band. Each of the nozzles is formed from a pair of converging planar members which terminate prior to touching to form an orifice, and this orifice extends substantially the entire width of the cooling tunnel such that goods passing therethrough will be subjected to a high velocity curtain of heat exchange medium at discrete intervals along their travel through the tunnel. That section of the tunnel below the conveyor band may act as a suction chamber wherethrough the air or other gaseous medium is returned to the cooling apparatus for recirculation.

Figure 1:
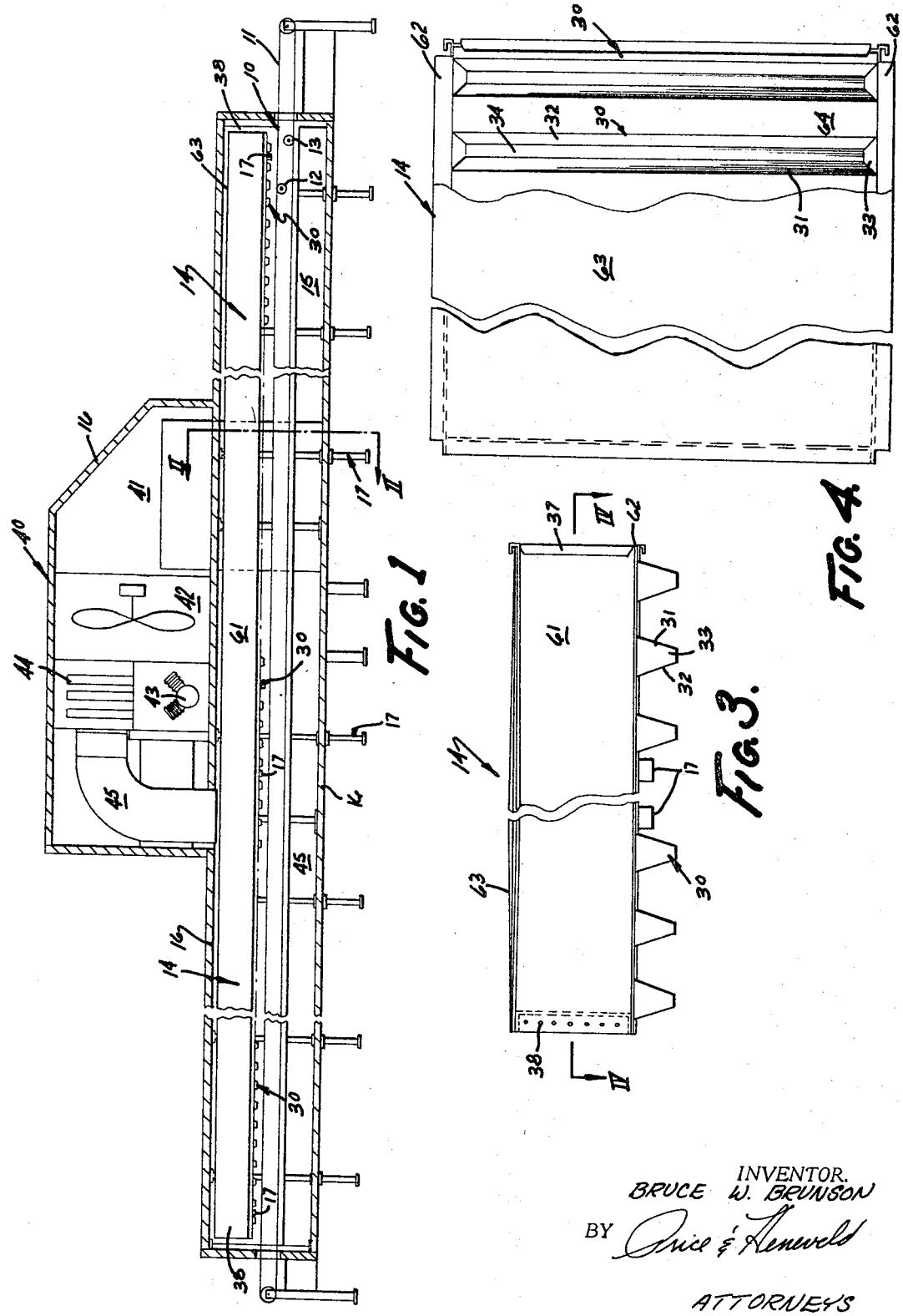
FIG. 1 is a broken elevational view, partially in cross-section, of a cooling tunnel and its associated refrigeration equipment.
Figure 2:
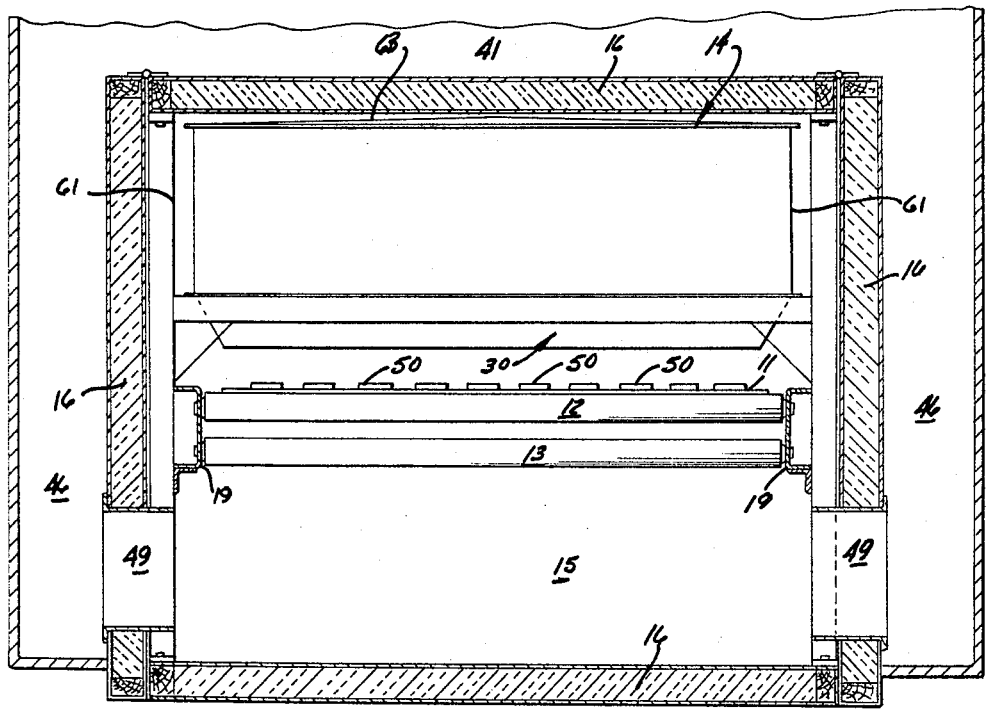
FIG. 2 is a cross-sectional view taken along line II—II of FIG. 1.

Referring now to the figures, a preferred embodiment of this invention will be described in detail. For purposes of illustrating the invention, a cooling tunnel environment has been chosen. It will be apparent, however, to those skilled in the art that the novel concepts disclosed herein are equally adaptable to heating or freezing tunnels. FIGS. 1 and 2 show a tunnel, indicated generally by the reference numeral 10. A mesh conveyor 11 is rotatably mounted for longitudinal traverse through tunnel 10. Conveyor 11 is supported by a plurality of support rollers 12 along its working path and a plurality of idler rollers 13 along its return path. Support rollers 12 and idler rollers 13 are rotatably carried by a plurality of mounting brackets 19 affixed to the sides of the cooling tunnel. Positioned above the tunnel 10 is a pressure duct 14 into which is pumped cooled air. Beneath the conveyor band, a return chamber 15 is provided into which the air enters after passing over the baked goods and through which the air returns to the refrigeration equipment for recirculation. The entire tunnel is covered with insulation 16 and suitably supported within and without by a conventional framework indicated generally by the reference numeral 17.

Pressure duct 14 is formed from a pair of side panels 61 each of which has an outwardly diverging tab 62 extending from the longitudinal edge thereof. A cover plate 63 is affixed to these tabs 62 by any well-known means such as welding or crimping. Preferably cover plate 63 is cross broken in a well-known manner to improve the overall rigidity of the duct.

Figure 5:
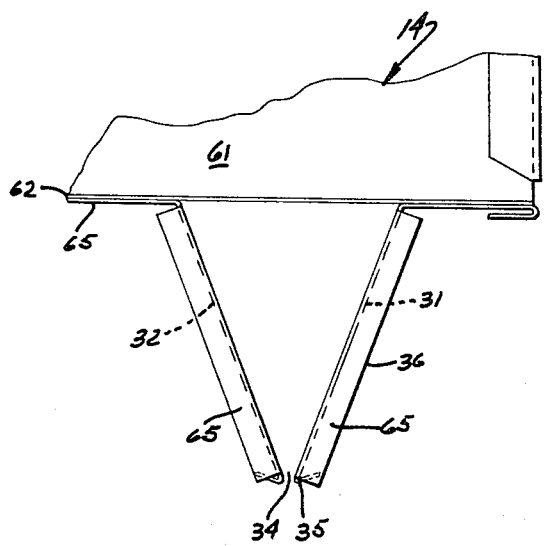
FIG. 5 is a fragmentary view illustrating the details of the elongated orifice nozzle.

Communicating with lower surface of pressure duct 14 and projecting into the cooling tunnel 10 are a plurality of nozzle assemblies 30. By reference to FIGS. 3, 4 and 5, it will be seen that each of these nozzle assemblies comprise two converging planar members 31 and 32 having an end cap 33 positioned across each lateral extremity thereof. The end caps 33 may be welded to tabs 65 formed during fabrication of planar members 31 and 32. The converging planar members 31 and 32 terminate prior to touching such that an elongated orifice 34 is formed which extend substantially the entire width of the pressure duct. The converging planar members 31 and 32 are preferably, as shown, individually welded to the lower tabs 62 of the side panels 61. Individual strips of metal 64 may be utilized between these members in order to seal the areas therebetween and furnish the spacings for the planar nozzle members. Alternatively, planar members 31 and 32 may be spot welded to lateral slots stamped into the bottom plate of the pressure duct 14. Or they might be formed in a unitary stamping operation. As will be seen from FIGS. 3 and 5, however, best results are obtained when the nozzle assemblies 30 project into the cooling tunnel a substantial distance. It has been found, for example, that satisfactory air direction and uniformity may be obtained by longitudinally spacing the nozzles 30 approximately eight inches apart and by having approximately a four inch perpendicular distance between the orifice 34 and the plane of the lower side of pressure duct 14. When utilizing these dimensions, the width of the slot in pressure duct 14 to which the converging planar members 31 and 32 are affixed should be about three and one-half inches. As will be seen particularly with reference to FIG. 5, the tips 35 of the members 31 and 32 may be bent rearwardly to provide a smoother orifice and thus reduce the turbulence of the air emerging therefrom. Similarly, the sides 36 may be bent longitudinally to provide a flat surface upon which end cap 33 may be affixed. Conveniently, as shown in FIG. 3, the pressure duct and attached nozzle assemblies may be fabricated in sections with any type of conventional connecting means 37. Of course, the terminating ducts at each end of the cooling tunnel will be sealed as indicated at 38. In this manner, the duct sections with the nozzles already attached thereto may be placed into the cooling tunnel assembly prior to installation of one or several of the insulating walls 16.

Referring once again to FIGS. 1 and 2, the cooling system 40 is positioned above the cooling tunnel near the longitudinal center thereof and consists of a suction plenum 41, a blower 42, a compressor 43, cooling coils 44 and a pressure conduit 45 which commutes into pressure duct 14. All of the various elements of the cooling system 40 are well-known in the art and it is not deemed necessary to discuss them in detail. A pair of return ducts 46 connect return chamber 15 with suction plenum 41 such that the air may return for recirculation. Suitable communicating apertures 49 are provided between the return ducts 46 and the return chamber 15 below suction plenum 41.

In operation, the goods 50 to be cooled are transferred from an oven or the like onto mesh-type conveyor 11 which travels at a predetermined rate of speed in an endless manner. Air is pumped from suction plenum 41 by blower 42, forced through the cooling coils 44 and travels therefrom via pressure conduit 45 into pressure duct 14. The approximate longitudinal centering of cooling unit 40 allows approximately equal volumes of air to flow from the pressure conduit 45 in each direction along the length of the pressure duct 14 and thus minimized heat exchange prior to the actual entrance of the air into the cooling tunnel. The blower 42 is of a sufficient capacity to maintain the pressure in pressure duct 14 at a predetermined level. This cool air is directed towards the conveyor band, and thus towards the goods 50 placed thereon, by nozzle assemblies 30. These nozzle assemblies, as noted previously, are spaced along the entire length of the cooling tunnel at desired intervals. The elongated nozzle orifice 34 causes the air to enter the cooling tunnel in a plurality of high velocity curtain-like configurations which are perpendicular to the path of travel of the band conveyor 11. Since the elongated orifices 34 and thus the curtains of cool air generated therefrom extend substantially the entire width of the band, the goods are uniformly subjected to the cooling stream of air as they pass thereunder regardless of their lateral position on the conveyor band.

The curtains of high velocity air impinge upon the goods being cooled with sufficient force to break the insulating boundary layer of air and cool the outside of the goods to the approximate temperature of the cooling medium. This cooling, as noted previously, establishes a maximum temperature gradient from the centers to the outer surfaces of the goods resulting in optimum cooling efficiency. The expanded air then travels back towards the center of the machine via duct 15 to return ducts 46 through which it travels into the suction plenum for recooling and recirculation.

The length of the cooling tunnel, and thus the number of curtains of cooled air to which the baked goods are subjected during their travel therethrough, is dependent upon the particular characteristics of the goods being cooled. It will be appreciated that a plurality of sliding valves could be provided within the pressure duct in order to reduce the effective cooling length of the tunnel and thus the amount of cooled air required to maintain the pressure in duct 14 at the prescribed level. The tunnel could be then efficiently utilized for cooling goods which cool relatively quickly as well as for cooling goods which require a relatively long cooling period.

The high velocity curtain-like air configuration at each nozzle assures uniform and adequate cooling of the goods placed on the conveyor belt. As pointed out previously, this high velocity configuration, and thus these nozzles, are suitable for use in any type of tunnel arrangement wherein heat exchange is to take place.

While a preferred embodiment of this invention has been described in detail, it will be recognized that many modifications may be made without departing from the scope and spirit of this disclosure. Such modifications are to be deemed as included within the scope of the following claims, unless these claims by their language expressly state otherwise.

I claim:
1. In a heat exchange tunnel having a conveyor band of air pervious construction through which a gaseous fluid can flow and which is adapted for carrying food products on the top surface thereof, the combination comprising:
   a pressure duct located only above said conveyor band;
   a heat exchange and pressure unit having a pressure outlet communicating with said pressure duct; a suction plenum communicating with said suction chamber;
   a plurality of nozzles spaced at intervals longitudinally above said band and extending in a direction transversely across said band, said nozzles each being formed to provide a jet orifice located above and extending across said band;
   said nozzles providing a plurality of curtain-like jets which impinge upon articles located on said conveyor band to break the layer of air surrounding each article and thereafter pass with said layer of air through said pervious band into said suction chamber and return to said heat exchange and pressure unit.

2. The combination as set forth in claim 1 wherein each of said nozzles comprises converging planar members which terminate prior to touching, the opening between said two members at their closest extremities forming said elongated orifice.

3. The combination as set forth in claim 1 wherein said heat exchange and pressure unit comprises cooling and compressing means positioned proximate the longitudinal mid-point of said tunnel.

4. The combination as set forth in claim 1 wherein the band is of mesh construction.

5. The combination as set forth in claim 2 wherein the pressure duct extends substantially the entire length of said tunnel and said planar members extend at their widest point from said pressure duct.

References Cited

UNITED STATES PATENTS

| | | | |
|---|---|---|---|
| 2,776,544 | 1/1957 | Schulerud | 62—380 X |
| 3,068,586 | 12/1962 | Vaughan et al. | 62—63 X |
| 3,115,756 | 12/1963 | Overbye | 62—63 X |

ROBERT A. O'LEARY, *Primary Examiner.*

T. W. STREULE, *Assistant Examiner.*